United States Patent
Xian et al.

(10) Patent No.: US 10,386,682 B2
(45) Date of Patent: Aug. 20, 2019

(54) SUBSTRATE AND DISPLAY DEVICE

(71) Applicant: BOE TECHNOLOGY GROUP CO., LTD., Beijing (CN)

(72) Inventors: Jianbo Xian, Beijing (CN); Yong Qiao, Beijing (CN); Hongfei Cheng, Beijing (CN); Wenbo Li, Beijing (CN); Pan Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 415 days.

(21) Appl. No.: 14/769,690

(22) PCT Filed: Dec. 4, 2014

(86) PCT No.: PCT/CN2014/093011
§ 371 (c)(1),
(2) Date: Aug. 21, 2015

(87) PCT Pub. No.: WO2016/019663
PCT Pub. Date: Feb. 11, 2016

(65) Prior Publication Data
US 2016/0252786 A1    Sep. 1, 2016

(30) Foreign Application Priority Data
Aug. 5, 2014 (CN) .................. 2014 2 0438070 U

(51) Int. Cl.
*G02F 1/1343* (2006.01)
*G02F 1/1362* (2006.01)

(52) U.S. Cl.
CPC .. *G02F 1/134336* (2013.01); *G02F 1/136286* (2013.01); *G02F 2001/134318* (2013.01); *G02F 2201/121* (2013.01)

(58) Field of Classification Search
None
See application file for complete search history.

(56) References Cited

U.S. PATENT DOCUMENTS 6,403,980 B1 *  6/2002  Park .................. G02F 1/136213
                                                  257/296
6,573,532 B2 *  6/2003  Park .................. G02F 1/136213
                                                  257/296

(Continued)

FOREIGN PATENT DOCUMENTS

CN    101477286 A      7/2009
CN    101813840 A  *   8/2010

(Continued)

OTHER PUBLICATIONS

Google Patents english machine translation of CN101813840A.*

(Continued)

*Primary Examiner* — Edward J Glick
*Assistant Examiner* — David Y Chung
(74) *Attorney, Agent, or Firm* — Ladas & Parry LLP

(57) ABSTRACT

A substrate and a display device are disclosed. The substrate includes a plurality of common electrode lines that are spaced at an interval, configured for providing corresponding pixel units with a common voltage; at least two connecting lines, each of which is located in a display region, and which are configured for achieving mutual electrical connection between at least two of the common electrode lines that are adjacent.

15 Claims, 3 Drawing Sheets

(56) References Cited

U.S. PATENT DOCUMENTS

| | | | | |
|---|---|---|---|---|
| 7,609,354 | B2* | 10/2009 | Konno | G02F 1/134363 |
| | | | | 349/149 |
| 2005/0134783 | A1 | 6/2005 | Park et al. | |
| 2012/0200819 | A1* | 8/2012 | Huang | G02F 1/136259 |
| | | | | 349/144 |
| 2014/0198277 | A1* | 7/2014 | Yu | G02F 1/136286 |
| | | | | 349/43 |
| 2015/0241743 | A1* | 8/2015 | Jung | G02F 1/136286 |
| | | | | 349/43 |

FOREIGN PATENT DOCUMENTS

| | | |
|---|---|---|
| CN | 103926757 A | 7/2014 |
| JP | 2001-305578 A | 10/2001 |

OTHER PUBLICATIONS

Google Patents english machine translation of CN103926757A.*
Google Patents english machine translation of CN101477286A.*
International Search Report & Written Opinion of the International Searching Authority Appln. No. PCT/CN2014/093011; dated May 6, 2015.

* cited by examiner

US 10,386,682 B2

SUBSTRATE AND DISPLAY DEVICE

TECHNICAL FIELD

Embodiments of the present invention pertain to the field of display, and more particularly, to a substrate and a display device.

BACKGROUND

Liquid crystal displays (LCDs) have been widely applied to televisions, cell phones, public information, and so on for display by virtue of merits such as small volume, light weight, low power consumption, low drive voltage, no radiation and so on, and belong to such a display technology that is most widely used at present.

A liquid crystal display includes a color filter substrate and an array substrate as well as a liquid crystal layer interposed between the two substrates. A common electrode and a pixel electrode are respectively provided on the color filter substrate and the array substrate, and a voltage is applied across the pixel electrode and the common electrode when they are in operation, so that an electric field is generated by a voltage difference between the two electrodes. The alignment of liquid crystal molecules in the liquid crystal layer is modified by the electric field, and in turn, transmittance of light through the liquid crystal layer is changed. Thus, the function of displaying images is achieved.

SUMMARY

According to embodiments of the invention, there are provided a substrate and a display device, capable of reducing the resistance of a common electrode line and improving the uniformity in display.

According to at least one embodiment of the invention, there is provided a substrate, comprising: a plurality of common electrode lines that are spaced at an interval, configured for providing corresponding pixel units with a common voltage; at least two connecting lines, each of which is located in a display region, and which are configured for achieving mutual electrical connection between at least two of two or more common electrode lines that are adjacent.

In an embodiment, for example, each of the common electrode lines is connected to common electrodes in pixels in at least one row or column.

In an embodiment, for example, the substrate is divided into multiple zones, and electrical connection between common electrode lines situated within the same one of the zones is achieved by the connecting lines.

In an embodiment, for example, the substrate further includes common leads disposed at an edge of the substrate, and common electrode lines situated within the same one of the zones are connected to the same one of the common leads.

In an embodiment, for example, voltages on the common leads for connection with common electrode lines within different zones are different.

In an embodiment, for example, the connecting lines include a first connecting line and a second connecting line; common electrodes of at least four pixel units in different rows are electrically connected to each other by the first connecting line and the second connecting line, so as to form an enclosed, ring-shaped common electrode unit.

In an embodiment, for example, the common electrode units in the same row or column are electrically connected to each other.

In an embodiment, for example, when common electrode lines included in the common electrode unit are odd, the common lead is connected to the (N+1)/2th common electrode line; or, when common electrode lines included in the common electrode unit are even, the common lead is connected to the N/2th and the (N/2+1)th common electrode lines.

In an embodiment, for example, the substrate is an array substrate or a counter substrate.

In an embodiment, for example, the substrate is an array substrate, and the array substrate further includes data lines and gate lines, the common electrode lines are parallel to and disposed in the same level as the gate lines. The connecting lines are parallel to and disposed in the same level as the data lines; or, the common electrode lines are parallel to and disposed in the same level as the data lines; the connecting lines are parallel to and disposed in the same level as the gate lines.

In an embodiment, for example, the common electrode lines and the connecting lines are connected through via holes.

According to at least an embodiment of the invention, there is further provided a display device, which includes the substrate as stated in any of above items.

BRIEF DESCRIPTION OF THE DRAWINGS

In order to illustrate the technical solution of the embodiments of the invention more clearly, the drawings of the embodiments will be briefly described below; it is obvious that the drawings as described below are only related to some embodiments of the invention, but are not limitative of the invention.

REFERENCE NUMERALS

10—common electrode; 11—common electrode line; 12—connecting line; 121—first connecting line; 122—second connecting line; 13—gate line; 14—data line; 15—region; 20—common electrode unit.

DETAILED DESCRIPTION

Hereinafter, the technical solutions in the embodiments of the invention will be described in a clearly and fully understandable way in connection with the drawings in the embodiments of the invention. It is obvious that the described embodiments are just a part but not all of the embodiments of the invention.

Figure 1:
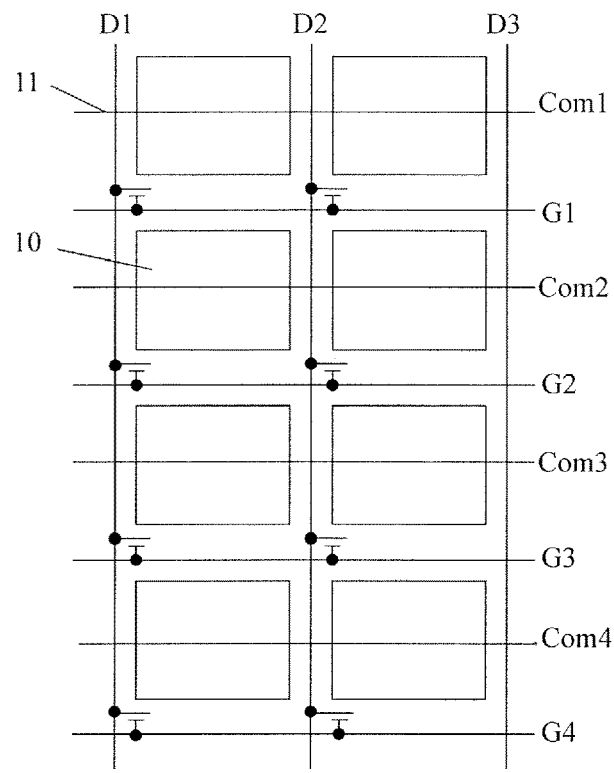
FIG. 1 is a schematic view illustrating the planar structure of an array substrate.

The common electrode in a liquid crystal display is generally in a structure of a whole piece of film (a plate-like structure) covering a display region, or has a structure of the block/segment design as shown in FIG. 1. In FIG. 1, one common electrode 10 is provided in each of pixel units, and one common electrode line 11 (such as Com1 to Com4) is provided for each row of pixel units, and configured for providing common electrodes 10 of the pixel units in the row with a common voltage required for driving liquid crystals. Along with the length, a voltage drop may exist on a common electrode line 11, so that the voltage distribution over the common electrodes of the whole panel is non-uniform, and this will degrade the uniformity in display.

According to at least an embodiment of the present invention, there is provided an array substrate. Referring to that shown in FIG. 2, the array substrate includes a plurality of common electrode lines 11 that are spaced at an interval, configured for providing corresponding pixel units with a common voltage. The array substrate further includes at least two connecting lines 12, each of which is located in a display region, and which are configured for achieving mutual electrical connection between at least two adjacent common electrode lines 11.

In the embodiment, two or more common electrode lines 11 that are adjacent are electrically connected to each other by connecting lines 12. The connection may be a direct connection type, namely, one end of a connecting line 12 is connected to one common electrode line 11, the other end thereof is connected to another common electrode line 11, and intermediate point(s) of the connecting line 12 between both ends may also be connected to other more common electrode line(s) 11. The connection may also be an indirect connection type, namely, each of common electrode lines 11 is connected to common electrodes 10 in pixels in at least one row (or column), and common electrodes in adjacent rows (or columns) are connected through the connecting lines 12. Two or more adjacent common electrode lines 11 are electrically connected to each other by the connecting lines 12 generally in a direction perpendicular to the common electrode lines 11.

Generally speaking, the row direction in the technical field of liquid crystal display generally refers to the direction in parallel to gate lines, the column direction generally refers to the direction in parallel to data lines, and descriptions herein can be understood in this way. However, it can be understood by those skilled in the art that, row or column in the embodiment is only used for the purpose of describing relative concepts, and they cannot be absolutely defined.

In embodiments of the present invention, by means of electrically connecting two (or more) adjacent common electrode lines to each other with at least two connecting lines, it is possible that adjacent common electrodes lines are connected in parallel, or partial segments of adjacent common electrode lines are connected in parallel. It is well known that, after two resistors are connected in parallel, the total resistance will be reduced. Thus, the resistance of a common electrode line can be reduced by provision of connecting lines, and the uniformity in display can be improved. In addition, as the connecting lines are located in the display region, they can be formed synchronously in the manufacturing process of the array substrate, without the need of adding a procedure additionally.

In order that the technical scheme provided by embodiments of the invention are better understood by those skilled in the art, the substrate provided by the invention will be described in detail below by specific embodiments.

Figure 2:
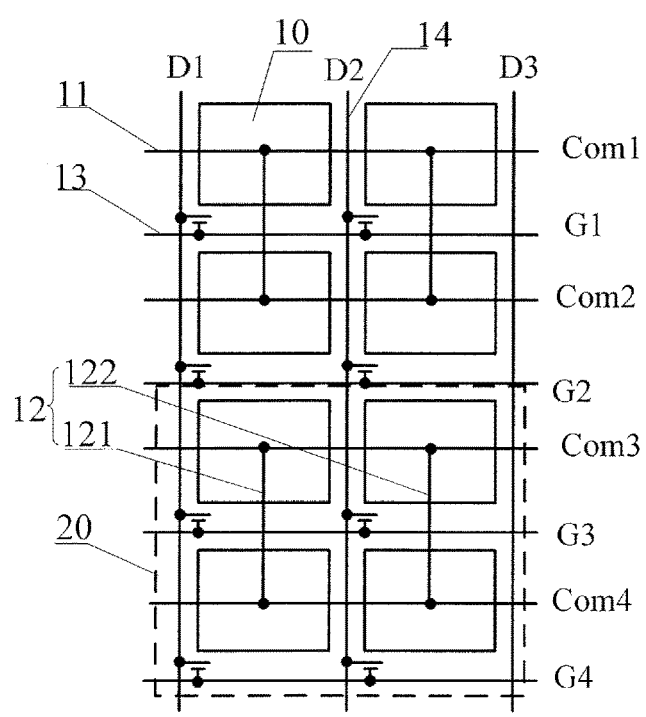
FIG. 2 is schematic view 1 illustrating the planar structure of an array substrate in a first example of an embodiment of the invention.

An array substrate shown in FIG. 2 is a first example in accordance with a present embodiment. The array substrate includes gate lines 13 (e.g., G1 to G4) distributed laterally, and data lines 14 (e.g., D1 to D3) distributed longitudinally, with pixel units being provided in regions where the gate lines 13 and the data lines 14 intersect with each other. A common electrode 10 and a pixel electrode (located above or below the common electrode 10, not shown in the figure) are provided in each of pixel units, and a thin film transistor functioning as a switch element is also provided at the crossing of a gate line 13 and a data line 14. In each of pixel units, a source electrode of the thin film transistor is connected to a data line 14, its drain electrode is connected to a pixel electrode, and its gate electrode is connected to a gate line 13. Each common electrode line 11 is connected to common electrodes 10 in one row, and configured for providing common electrodes 10 in one row with a common voltage, and common electrode lines 11 in every two rows that are adjacent longitudinally are connected by at least two connecting lines 11.

Optionally, it is also possible that common electrode lines 11 in every three rows, or every four or more rows are connected by at least two connecting lines 11.

Optionally, the connecting lines 12 may include a first connecting line 121 and a second connecting line 122; and common electrodes 10 of at least four pixel units situated in different rows are electrically connected to each other by a first connecting line 121 and a second connecting line 122, so as to form a closed, ring-shaped common electrode unit 20.

For example, the way of connecting common electrodes 10 may be that of, as shown in FIG. 2, electrically connecting common electrodes of at least four pixel units in pixel units in every two rows that are adjacent longitudinally to each other by a first connecting line 121 and a second connecting line 122, so as to form a closed, ring-shaped common electrode unit 20. Although only pixel units in four rows and two columns are shown in FIG. 2, practically and similarly, more common electrode units 20 with the same structure may be present in regions not shown in the figure.

Figure 3:
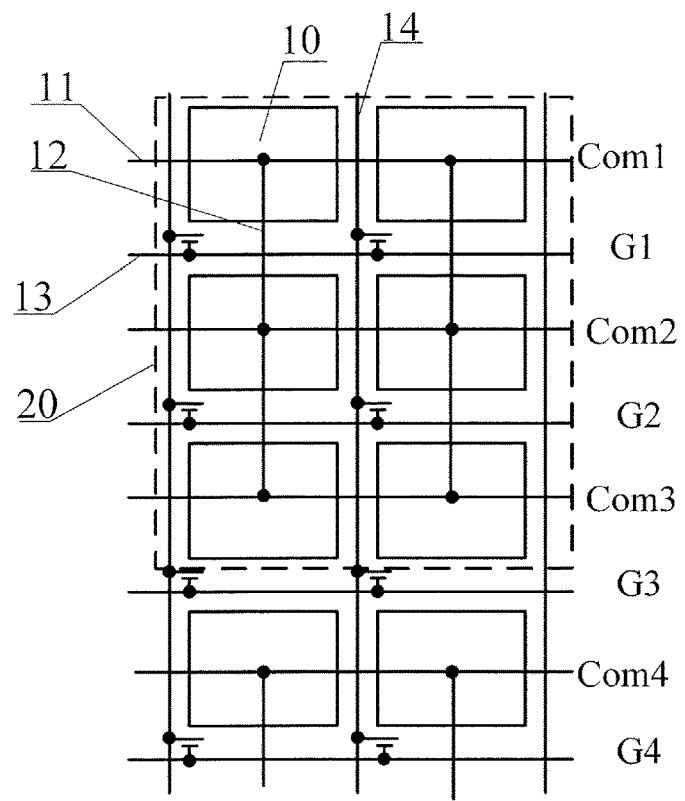
FIG. 3 is schematic view 2 illustrating the planar structure of an array substrate in a first example of an embodiment of the invention.
Figure 4:
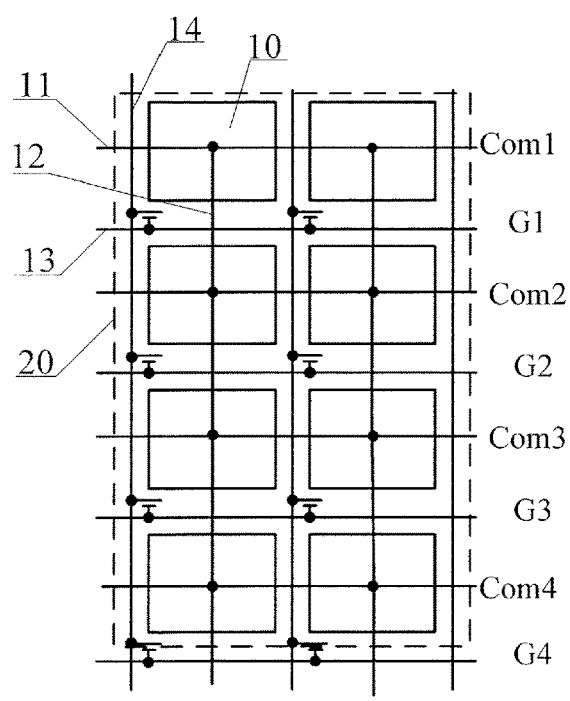
FIG. 4 is schematic view 3 illustrating the planar structure of an array substrate in a first example of an embodiment of the invention.

Alternatively, it is also possible that as shown in FIG. 3 and FIG. 4, common electrodes 10 of pixel units in every three rows or every four rows that are adjacent longitudinally are connected to each other so as to form one common electrode unit 20. Of course, the number of pixel units in a common electrode unit 20 is not limited to the above manner, and the resistance of a common electrode line can be reduced by the configuration provided in embodiments of the invention. Thus, the voltage drop of a common electrode signal is reduced, and the uniformity in display is improved.

Further, the above common electrode units 20 located in the same row or the same column are electrically connected to each other. Common electrode units 20 in a same row or a same column are electrically connected to each other at least by one wiring. For example, only common electrode units 20 in a same row that are adjacent laterally are connected, only common electrode units 20 in the same column that are adjacent longitudinally are connected, or the two connecting ways are used in combination.

Optionally, the above common electrode lines 11 may be parallel to and disposed in the same level as the gate lines 13, connecting lines 12 may be parallel to and disposed in the same level as the data lines 14, and the common electrode lines 11 and the connecting lines 12 are located in different levels, and are mutually connected by provision of via holes.

Upon fabrication, as the connecting lines 12 and the gate lines 13 are disposed in the same level, the gate lines 13 and the connecting lines 12 may be formed synchronously in the manufacturing process of the array substrate, without the need of additionally requiring a procedure for the connecting lines.

Figure 5:
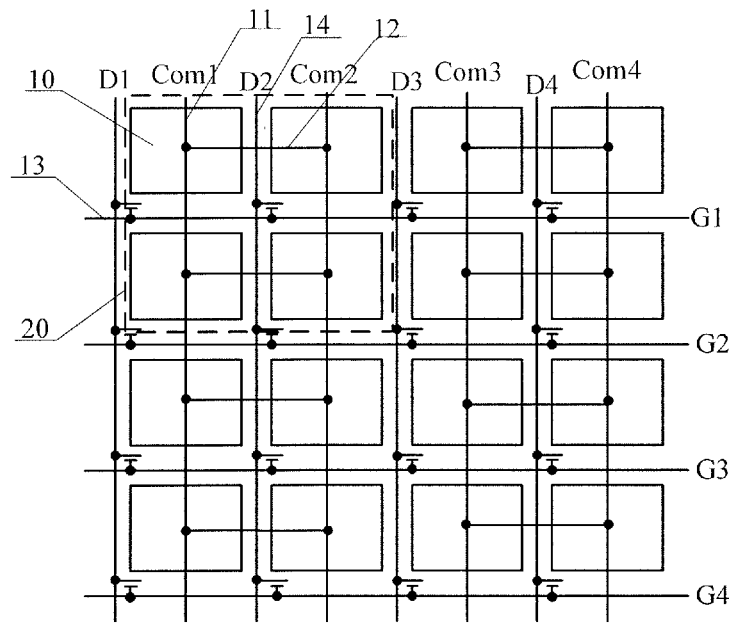
FIG. 5 is a schematic view illustrating the planar structure of an array substrate in a second example of an embodiment of the invention.

That shown in FIG. 5 is a second example provided by the embodiment, and differs from the above example in that, common electrode lines 11 (e.g., Com 1 to Com 4) in the example is disposed in parallel to the data lines 14, each of the common electrode lines 11 is connected to common electrodes 10 in one column, and configured for providing the common electrodes 10 in the column with a common voltage, common electrodes 10 in every two columns that are adjacent laterally are connected by at least two connecting lines 12, and the connecting lines 12 are disposed in parallel to the gate lines 13. Likewise optionally, in the example, common electrodes 10 in every three columns or every four or more columns that are adjacent laterally may also be connected by at least two connecting lines 12.

Specifically, the more detailed connecting way in the example is as follows: common electrodes 10 of four pixel units in pixel units in every two columns that are adjacent laterally are electrically connected by common electrode lines 11 and two connecting lines 12, so as to form one enclosed, ring-shaped common electrode unit 20. Similar to those shown in FIG. 3 and FIG. 4, it is also possible that common electrodes of pixel units in every three columns or every four or even more columns that are adjacent laterally form one common electrode unit 20. Further, common electrode units 20 located in the same column are electrically connected to each other.

In the example, by means of electrically connecting common electrode lines arranged in parallel to data lines to each other by connecting lines, the resistance of the common electrode lines and the voltage drop of a common electrode signal can be reduced, and thus, uniformity in display is improved.

Figure 6:
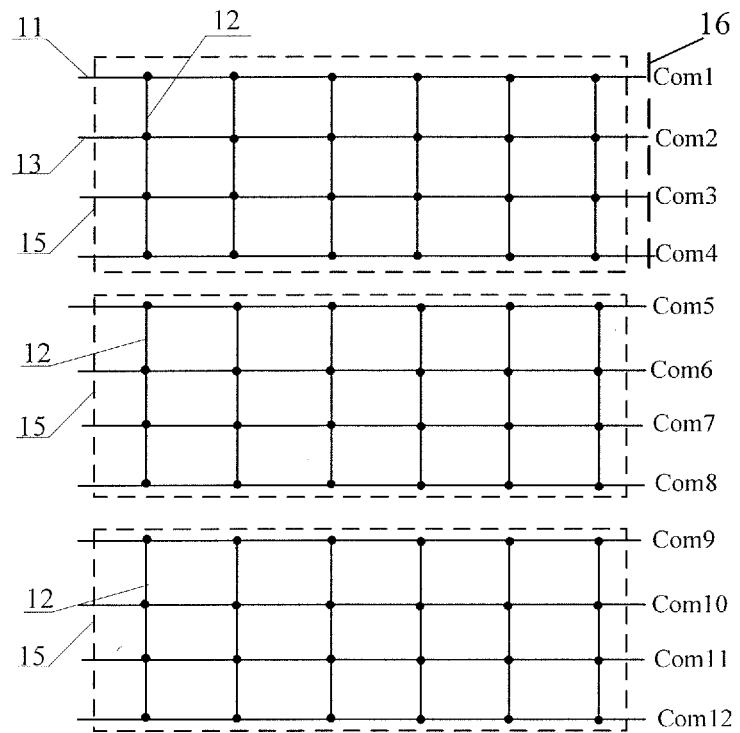
FIG. 6 is a schematic view illustrating the planar structure of an array substrate in a third example of an embodiment of the invention

That shown in FIG. 6 is a third example in accordance with the embodiment, and differs from the above two examples in that, in the example, a substrate is divided into multiple zones 15, and common electrode lines 11 situated within the same zone 15 are connected by at least two connecting lines 12.

For the purpose of conciseness, the concrete illustration of common electrodes is omitted in FIG. 6, and only common electrode lines 11 (Com1 to Com12) and connecting lines 12 are shown. The connection between common electrode lines 11 and common electrodes, and the connection between connecting lines 12 and common electrode lines 11, can reference to FIGS. 2 to 5 for details. Twelve common electrode lines 11 (Com1 to Com12) are shown in the drawing, and every four adjacent common electrode lines 11 are grouped into one zone 15. That is, common electrode lines Com1 to Com4 are grouped into a first zone 15, common electrode lines Com4 to Com8 are grouped into a second zone 15, and common electrode lines Com8 to Com12 are grouped into a third zone 15. If there are more common electrode lines, then the following are grouped in a same way. With the first zone 15 as an example, the four rows of common electrode lines (Com1 to Com4) in the zone 15 are all mutually connected by at least two connecting lines 12, and each black spot in the drawing just represents the joint between one connecting line 12 and a common electrode line 11. Further, a plurality of connecting lines 12 are used for connecting common electrodes within each zone to be a reticular structure, so as to reduce the resistance of common electrode lines, and to improve the uniformity in display.

Further, common leads are also provided at an edge of the substrate, and common electrode lines 11 located within the same zone 15 are connected to a same common lead. Referring to FIG. 6, common electrode lines Com1 to Com4 in the first zone 15 are connected to one common lead 16; similarly, common electrode lines Com4 to Com8 in the second zone 15 are connected to a second common lead (not shown); and similarly, common electrode lines Com8 to Com12 in the third zone 15 are connected to a third common lead (not shown). The rest are deduced in a same way, and other zones will not be described any more.

Optionally, voltages on common leads for connecting common electrode lines within different zones vary. For the sake of further improving the uniformity in display, it is possible that according to actual requirements, different common voltages are provided by common leads to different zones, so as to compensate the voltage drop of a common electrode signal upon transmission.

According to the embodiment, there is further provided a variant of the third example, which differs from the third example in that, firstly, common electrodes in adjacent pixel units are electrically connected to each other by first connecting lines and second connecting lines, so as to form a plurality of enclosed, ring-shaped common electrode units. Common leads are provided at an edge of the substrate. If common electrode lines included in a common electrode unit are odd, then a common lead is connected to the $(N+1)/2$th common electrode line; and if common electrode lines included in a common electrode unit are even, then a common lead is connected to the $N/2$th and the $(N/2+1)$th common electrode lines. In this connection way, it is possible that according to actual requirements, different common voltages are provided by common leads to zones where common electrode units are located, so as to compensate the voltage drop of a common electrode signal upon transmission, and moreover, the distribution of a common voltage over a common electrode line net of the zone where a common electrode unit is located can be made more even.

In the example, by way of division of diverse zones and provision of common voltage of different magnitudes for different zones, it is possible that the resistance of a common electrode line is reduced, and the voltage drop of a common electrode signal upon transmission is compensated. Thus, the uniformity in display is improved.

According to an embodiment of the invention, there is further provided a display device, which includes any of the above-mentioned array substrate. The display device includes an array substrate and a counter substrate that are disposed opposite each other to form a liquid crystal cell, in which, a liquid crystal material is filled. The counter substrate is such as a color filter substrate. In some examples, the liquid crystal display device further includes a backlight source for providing the array substrate with backlight.

With respect to the display device according to embodiments of the invention, as the voltage drop of a common electrode signal upon transmission is smaller, a higher display quality can be achieved. The display device may be a liquid crystal panel, an electronic paper, an OLED panel, a cell phone, a tablet computer, a television, a display, a notebook computer, a digital photo frame, a navigator, a watch or any other product or component having a display function.

According to embodiments of the invention, there are provided a substrate and a display device, in which, two (or more) adjacent common electrode lines are electrically connected to each other by provision of at least two connecting lines, and by utilizing the principle that total resistance is reduced after two resistors are connected in parallel, the resistance of a common electrode line is reduced, and the uniformity in display is improved. In addition, the substrate may be an array substrate, and as the connecting lines are located in a display region, they can be completed synchronously in the manufacturing process of the array substrate, without the need of additionally requiring a procedure.

The substrates in the above embodiments have been each introduced with reference to an example that the substrate is an array substrate. Optionally, the substrate may also be a counter substrate (e.g., a color filter substrate), and in this case, a common electrode may not be formed over an array substrate. It can be understood that, corresponding "pixel units" in this case may be pixel units on the array substrate.

Embodiments in the specification have each been described by using a progressive pattern, the same or similar portions between the embodiments only have to make reference to each other, and key explanations of each embodiment are differences with other embodiments. Especially, with regard to a device embodiment, the description of it is relatively simple as it is basically similar to the method embodiment, and for relevant aspects, the only thing to do is to make reference to the description of those portions in the method embodiment.

The descriptions made above are merely exemplary embodiments of the invention, but are not used to limit the protection scope of the invention. The protection scope of the invention is defined by attached claims.

This application claims the benefit of priority from Chinese patent application No. 201420438070.0, filed on Aug. 5, 2014, the disclosure of which is incorporated herein by reference in its entirety as a part of the present application.

What is claimed is:

1. A substrate, comprising:
a plurality of common electrode lines that are spaced at an interval, configured for providing corresponding pixel units with a common voltage; and
at least two connecting lines, each of which is located in a display region, and which are configured for achieving mutual electrical connection between at least two of the common electrode lines that are adjacent,
the substrate, further comprising:
common leads, disposed at an edge of the substrate, and common electrode lines situated within the same one of the zones are connected to the same one of the common leads,
wherein, voltages on the common leads for connection with common electrode lines within different zones are different,
wherein common electrodes of at least four pixel units in different rows are electrically connected to each other by the first connecting line and the second connecting line, so as to form an enclosed, ring-shaped common electrode unit,
where common electrode lines included in the common electrode unit are odd, the common lead is connected to the (N+1)/2th common electrode line; or, where common electrode lines included in the common electrode unit are even, the common lead is connected to the N/2th and the (N/2+1)th common electrode lines.

2. The substrate claimed as claim 1, wherein, each of the common electrode lines is connected to common electrodes in pixel units in at least one row or column.

3. The substrate claimed as claim 1, wherein, the substrate is divided into multiple zones, and electrical connection between common electrode lines situated within the same one of the zones is achieved by the connecting lines.

4. The substrate claimed as claim 3, wherein, the connecting lines include a first connecting line and a second connecting line.

5. The substrate claimed as claim 4, wherein, the common electrode units in the same row or column are electrically connected to each other.

6. The substrate claimed as claim 1, wherein, the substrate is an array substrate or a counter substrate.

7. The substrate claimed as claim 6, wherein, the substrate is an array substrate, the substrate further includes data lines and gate lines,
the common electrode lines are parallel to and disposed in the same level as the gate lines, and the connecting lines are parallel to and disposed in the same level as the data lines; or,
the common electrode lines are parallel to and disposed in the same level as the data lines, and the connecting lines are parallel to and disposed in the same level as the gate lines.

8. The substrate claimed as claim 7, wherein, the common electrode lines and the connecting lines are connected through via holes.

9. A display device, comprising the substrate claimed as claim 1.

10. The substrate claimed as claim 2, wherein, the substrate is divided into multiple zones, and electrical connection between common electrode lines situated within the same one of the zones is achieved by the connecting lines.

11. The substrate claimed as claim 10, wherein, the connecting lines include a first connecting line and a second connecting line;
common electrodes of at least four pixel units in different rows are electrically connected to each other by the first connecting line and the second connecting line, so as to form an enclosed, ring-shaped common electrode unit.

12. The substrate claimed as claim 11, wherein, the common electrode units in the same row or column are electrically connected to each other.

13. The substrate claimed as claim 12, wherein, where common electrode lines included in the common electrode unit are odd, the common lead is connected to the (N+1)/2th common electrode line; or, where common electrode lines included in the common electrode unit are even, the common lead is connected to the N/2th and the (N/2+1)th common electrode lines.

14. The substrate claimed as claim 1, wherein, the connecting lines include a first connecting line and a second connecting line;
common electrodes of at least four pixel units in different rows are electrically connected to each other by the first connecting line and the second connecting line, so as to form an enclosed, ring-shaped common electrode unit.

15. The substrate claimed as claim 14, wherein, the common electrode units in the same row or column are electrically connected to each other.

* * * * *